UNITED STATES PATENT OFFICE.

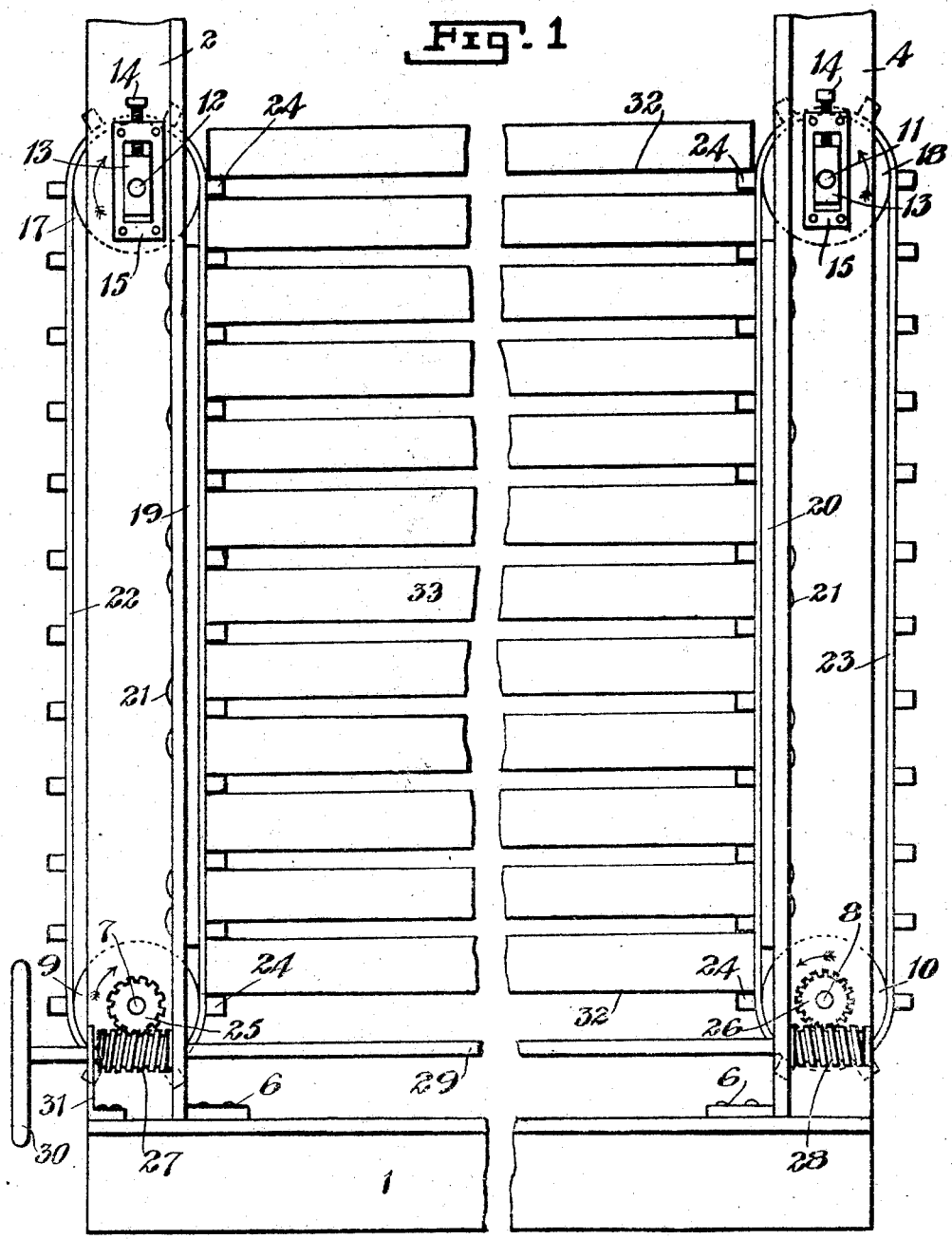

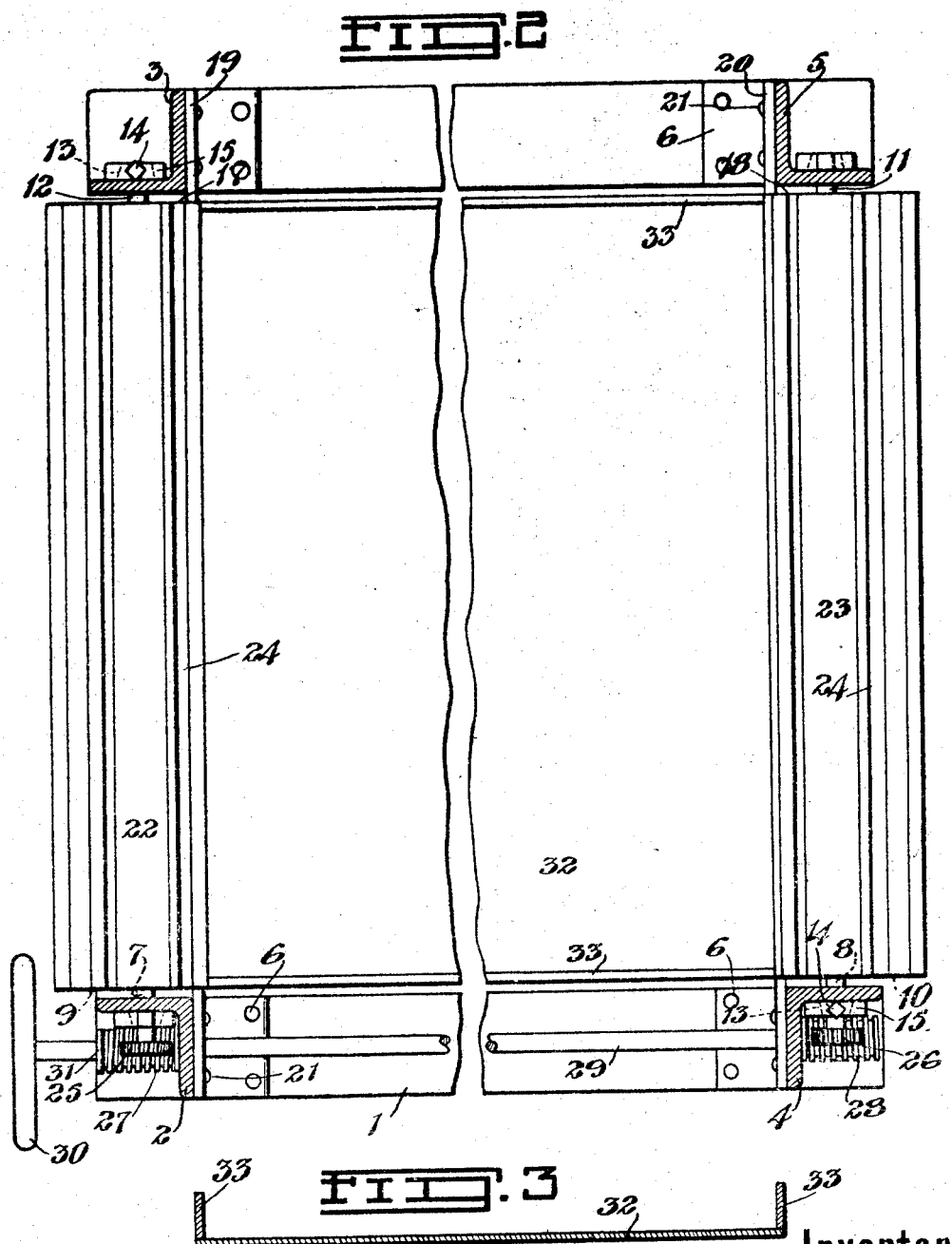

JOHN ROBERT SPEAR, OF WINNIPEG, MANITOBA, CANADA.

MACHINE FOR MANUFACTURING PLASTER-BOARDS.

No. 928,078.  Specification of Letters Patent.  Patented July 13, 1909.

Application filed June 13, 1908. Serial No. 438,369.

*To all whom it may concern:*

Be it known that I, JOHN ROBERT SPEAR, of the city of Winnipeg, in the Province of Manitoba, Canada, have invented certain new and useful Improvements in Machines for Manufacturing Plaster-Boards, of which the following is the specification.

My invention relates to machines for manufacturing plaster board or other such boards which require a length of time to set.

The object of the invention is to provide an inexpensive, efficient, durable, and compact machine, particularly adapted for this class of work.

It consists essentially in an opposing set of vertical uprights, each set carrying a pair of rotatable and adjustable rollers on which are mounted endless belts having cross strips thereon and trays adapted to pass between and be supported by the cross strips, the parts being arranged and constructed as hereinafter more particularly described.

Figure 1 is a side elevation of my machine. Fig. 2 is a plan view as in Fig. 1. Fig. 3 is a vertical sectional view through one of the trays.

In the drawings like characters of reference indicate corresponding parts in each figure.

1 represents a rectangular framework which is formed of four angle bars riveted the one to the other at the corners.

2 and 3 are one set of vertical angle bar uprights at one side of the framework, and 4 and 5 are another set of opposing angle bar uprights at the other side of the frame. The angle bars are interconnected with the framework in any suitable manner, as shown in the drawings, by flaring the lower end of the angle bar outwardly as at 6 and bolting to the frame.

7 and 8 are two similar opposing cross shafts mounted in suitable bearings formed in the uprights, the shaft 7 passing between the uprights 2 and 3, and shaft 8 between uprights 4 and 5. The shafts are parallel and in the same horizontal plane.

9 and 10 are rollers mounted on the shafts and formed from tubular steel pipes which have been turned and had the ends plugged with hardwood to receive the shafts. Directly above these latter shafts are other similar shafts 11 and 12 which are carried at their ends in adjustable bearings 13 controlled by a thumb screw 14. The standards have an elongated vertical slot through which the shafts pass to allow them to enter the bearings 13 and to be adjusted vertically. The bearings 13 are held to the uprights by the plates 15 bolted to the uprights. The center of the latter plates is cut away and the inner edge of the plate is inclined to receive the inclined edge of the bearing 13, thereby preventing the bearing from being displaced outwardly. The screw 14 passes through a threaded opening in the plates 15 and has its lower end connected with the bearings 13 in the usual manner so that the raising or lowering of the screw raises or lowers the bearings. The shafts 11 and 12 are parallel to the shafts 7 and 8 and in the same vertical plane.

17 and 18 are rollers similar to those 9 and 10 mounted on the shafts 11 and 12.

19 and 20 are cross plates passing between each pair of the uprights to which they are held by bolts 21.

22 and 23 are endless belts passing around each pair of rollers and over the plates 19 and 20. The plates are provided to prevent the belts from being pressed inwardly toward the standards.

24 are wooden cross strips fastened at regular intervals to the belts and all horizontal.

25 and 26 are worm gears at the outer end of the shafts 7 and 8.

27 and 28 are right and left worms engaging respectively with the worm gears 25 and 26, such worms being mounted on a cross shaft 29 supported by the uprights. The one end of the shaft has a hand wheel 30 secured on it by which the shaft may be turned.

31 is a bracket extending upwardly from the frame and supporting that portion of the shaft between the hand wheel and the worm 27.

Before using the machine it is necessary to have the belts tight in order to prevent any slipping which might otherwise occur. It is further required that the strips 24 appear in pairs when the belts are rotated. In other words as each strip appears at the inner side of one of the belts it has to have directly opposite it one of the strips on the other of the belts.

32 are trays having side inclosing boards 33. The length of the tray is equal to the distance between the belts and its width to the width of the belts. The height of the side pieces 33 is somewhat less than the distance between the successive strips 24, in order that the tray may be inserted between the strips. The trays will have the body and the side portions made from wood and lined with zinc.

In using my invention the tray is placed on the upper opposing pair of cross strips 24 and the hand wheel 30 is turned till the belts close the ends of the tray. The tray is then filled with the proper material for making plaster board and leveled off even with the upper edges of the side pieces 33. This being done the hand wheel is turned in a direction which will rotate the rollers as indicated by the arrows. The second tray is then ready for filling.

The inner strips 24 are carried downwardly by the belts and the tray carried by the strips is lowered and another set of cross strips appear at the top. A second tray is placed on these and the hand wheel again turned as soon as it is filled. This operation is carried on continuously, a trap being placed in position at the top and removed at the bottom. The time it takes a tray to pass from the upper position to the lower is sufficient to allow the plaster board material to set and harden. It is to be noted the belts close over the ends of the trays as they pass downwardly.

What I claim as my invention is:

In a device of the class described, the combination with sets of opposing uprights carrying a suitably mounted and vertically directed opposing pair of imperforate endless belts having supporting cross strips disposed at equal intervals along their length, and appearing in opposing pairs at the adjacent sides of the belts, of trays having side inclosing pieces thereon, such trays being adapted to be supported by the opposing strips and to have their ends closed by the adjoining face of the belts; and cross plates secured to the uprights and bearing against the belts, the cross plates being designed to hold the belts against the ends of the trays, as and for the purpose specified.

Signed at Winnipeg, in the Province of Manitoba, this 28th day of May 1908.

JOHN ROBERT SPEAR.

Witnesses:
  JAS. M. TAPLEY,
  GERALD S. ROXBURGH.